United States Patent
Mrawek et al.

(10) Patent No.: US 10,649,193 B2
(45) Date of Patent: May 12, 2020

(54) DETECTOR DEVICE WITH IMPROVED SIGNAL-TO-NOISE RATIO COMPRISING A DETECTOR IN A HOUSING MOVEABLE AGAINST A FORCE OF A SPRING DEVICE

(71) Applicant: LEICA MICROSYSTEMS CMS GMBH, Wetzlar (DE)

(72) Inventors: Patric Mrawek, Neustadt (DE); Frank Schreiber, Bad Urach (DE); Roland Seifert, Heidelberg (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 345 days.

(21) Appl. No.: 15/520,854

(22) PCT Filed: Oct. 22, 2015

(86) PCT No.: PCT/EP2015/074454
§ 371 (c)(1),
(2) Date: Oct. 25, 2017

(87) PCT Pub. No.: WO2016/062798
PCT Pub. Date: Apr. 28, 2016

(65) Prior Publication Data
US 2018/0039057 A1 Feb. 8, 2018

(30) Foreign Application Priority Data
Oct. 22, 2014 (LU) .................... LU92583

(51) Int. Cl.
*G01J 1/04* (2006.01)
*G02B 21/28* (2006.01)
(Continued)

(52) U.S. Cl.
CPC ............ *G02B 21/28* (2013.01); *G01J 1/0252* (2013.01); *G01J 1/0271* (2013.01); *G01J 1/0403* (2013.01);
(Continued)

(58) Field of Classification Search
CPC ... H04N 5/2254; H04N 5/2257; G01J 1/0271; G01J 1/0403; G01J 1/0252; G01J 1/0448;
(Continued)

(56) References Cited

U.S. PATENT DOCUMENTS 3,999,403 A 12/1976 Bower et al.
6,707,028 B2 * 3/2004 Housh ................... A47B 53/02
250/221

(Continued)

FOREIGN PATENT DOCUMENTS

DE 365388 C 12/1922
DE 102009036066 A1 2/2011
(Continued)

*Primary Examiner* — Que Tan Le
(74) *Attorney, Agent, or Firm* — Leydig, Voit & Mayer, Ltd.

(57) ABSTRACT

A detector device is designed to capture light and to generate electrical signals. The detector device includes a housing and a detector disposed in the housing so as to be moveable at least partially in the housing and with respect to the housing. The detector device is useable in a detection system and/or in a microscope.

20 Claims, 10 Drawing Sheets

(51) Int. Cl.
*G01J 1/02* (2006.01)
*G02B 21/00* (2006.01)

(52) U.S. Cl.
CPC .......... *G01J 1/0448* (2013.01); *G02B 21/008* (2013.01); *G02B 21/0096* (2013.01); *G02B 21/0032* (2013.01)

(58) Field of Classification Search
CPC . G02B 21/0048; G02B 21/0096; G02B 21/28
USPC ....................................................... 250/239
See application file for complete search history.

(56) References Cited

U.S. PATENT DOCUMENTS

| | | |
|---|---|---|
| 2010/0271695 A1 | 10/2010 | Sendrowski et al. |
| 2011/0032614 A1 | 2/2011 | Liedtke et al. |
| 2013/0135650 A1 | 5/2013 | Kuronuma |

FOREIGN PATENT DOCUMENTS

| | | |
|---|---|---|
| DE | 202011109809 U1 | 3/2012 |
| EP | 0481381 A1 | 4/1992 |
| JP | S 56147024 A | 11/1981 |
| JP | H 1041490 A | 2/1998 |
| JP | 2004279067 A | 10/2004 |

\* cited by examiner

DETECTOR DEVICE WITH IMPROVED SIGNAL-TO-NOISE RATIO COMPRISING A DETECTOR IN A HOUSING MOVEABLE AGAINST A FORCE OF A SPRING DEVICE

CROSS-REFERENCE TO PRIOR APPLICATIONS

This application is a U.S. National Stage Application under 35 U.S.C. § 371 of International Application No. PCT/EP2015/074454 filed on Oct. 22, 2015, and claims benefit to Luxemburg Patent Application No. LU 92583 filed on Oct. 22, 2014. The International Application was published in German on Apr. 28, 2016 as WO 2016/062798 A1 under PCT Article 21(2).

FIELD

The invention relates to a detector device which is designed to capture light and to generate electrical signals, comprising a detector and a housing for the detector.

The invention also relates to a detector system having such a detector device, and to a microscope having such a detector device.

BACKGROUND

A detector device of the type mentioned at the outset is known in the art from DE 20 2011 109 809 U1, for example. This detector device is characterized in that a cooling component is arranged inside the housing and in that a light path is defined for the light to be detected, said light path passing through the cooling component. This document also discloses that the cooling component may be designed as a heat-conducting, electrically insulating intermediate element and/or that the cooling component or an additional cooling component may be designed as an active cooling component, especially as a Peltier element or a heat pump or a heat pipe.

DE 10 2009 036 066 A1 describes an optoelectronic detector which is cooled and which comprises a sensor for detecting an instantaneous value for a parameter such as ambient humidity or ambient dew point temperature. This sensor is connected to a control unit which controls the cooling device as a function of the detected value. Condensation on the detector can be avoided by considering the ambient humidity or dew point temperature when controlling the cooling device. Airtight encapsulation of the detector and cooling device is not necessary.

SUMMARY

In an embodiment, the present invention provides a detector device which is designed to capture light and to generate electrical signals. The detector device includes a housing and a detector disposed in the housing so as to be moveable at least partially in the housing and with respect to the housing.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The inventors have recognized that that malfunctions can occasionally arise in the detector devices known from the prior art, although none of the components of the detector device actually have a defect. In particular, the detector devices display a considerably reduced signal-to-noise ratio on a temporary basis.

In an embodiment, the present invention provides a detector device in which these malfunctions do not occur.

According to an embodiment, a detector device is provided in which the detector is arranged such that it can move at least partially in the housing and with respect to the housing.

In a manner according to an embodiment of the invention, it was recognized by the inventors that the malfunctions are primarily due to maladjustments of certain components in the detection device. These in turn are due to temperature-dependent expansion behavior of certain components, as was also recognized by the inventors in a manner according to an embodiment of the invention, although the known detector devices usually contain an active cooling device, especially having a Peltier element.

It was also recognized by the inventors that adequate heat transfer from the detector device to a heat absorption component located outside the detector device can only be ensured if the heat dissipation component in the detector device, by means of which heat is to be dissipated to a heat absorption component outside the detector device, is in sufficient contact with the heat absorption component for heat to be conducted. Furthermore, it was acknowledged by the inventors that an adequate contact for heat to be conducted cannot merely be ensured by sufficiently large surface areas of the heat dissipation component and the heat absorption component being in positive contact with one another, but rather that a minimum pressing force is also required. If this minimum pressing force is not reached, adequate heat dissipation from the detector device can no longer be ensured.

In particular, this can cause individual components of the detector device to expand as a function of temperature, leading to maladjustments. The maladjustments usually have negative effects on optical beam control and on electronic components. In the case of electronic components, an increased temperature usually results in a reduced signal-to-noise ratio.

A detector device in which the external heat connection is in turn subject to temperature-dependent expansion fluctuations can have particularly dramatic, and especially unforeseeable and uncontrollable consequences. In particular, if the pressing force, which should actually not fall below a minimum pressing force, is subject to temperature-dependent expansion fluctuations within the detector device, self-amplifying temperature effects often occur, at irregular intervals that cannot be identified by the user and which therefore make it very hard for the user to identify the cause of these effects.

In a manner according to an embodiment of the invention, it was also recognized by the inventors that this problem is due to the fact that the housing of the detector device is usually fixed, or in particular screwed, to a fixing point located some distance from the heat transfer point in an appliance located outside the detector device, such as in a microscope, for example. This has the disadvantage that the mechanical coupling point is remote from the heat transfer point, which means that the pressing force with which the heat dissipation component is pressed against the heat absorption component is subject to fluctuations, in particular temperature-dependent expansion fluctuations, involving the components located mechanically between said two components.

One particular inventive embodiment therefore provides that the pressing force with which the heat dissipation component is pressed against the heat absorption component located outside the detector device should be isolated from maladjustments and, in particular, temperature-dependent expansion fluctuations. This is achieved by positioning the detector comprising the heat dissipation component inside the housing such that it can move. This thus ensures that the housing can be fixed anywhere inside an appliance located outside the detector device, in particular a microscope or a confocal scanning microscope, while the detector and its heat dissipation component can independently still be in adequate heat-conducting contact with a heat absorption component.

The detector device according to an embodiment of the invention therefore has the particular advantage that heat dissipation is always ensured to a sufficient extent such that temperature-dependent maladjustments are substantially avoided or at least reduced to such an extent that they do not cause malfunctions. In particular, this advantageously prevents temperature-dependent expansion fluctuations influencing heat dissipation from the detector device by means of a self-amplifying effect.

In an embodiment of the invention that is particularly simple to implement, the heat dissipation component of the detector is connected directly and in particular screwed to the heat absorption component of the appliance located outside the detector device, in some cases by inserting a heat-conducting layer, for example made from carbon polymer film. To this end, the detector may comprise corresponding fixing elements, such as, for example, at least one threaded hole. The housing of the detector device may also comprise at least one fixing means so that it can be fixed inside the appliance located outside the detector device. Since, as described, the detector is arranged inside the housing such that it can be moved, the fixing of the housing has no influence on heat dissipation from the detector to an appliance located outside the detector device. However, the heat transfer point from the heat dissipation component to the heat absorption component located outside the detector device is in practice not usually sufficiently spatially accessible to allow fixing at this point. It is also conceivable that fixing the entire detector device purely by means of the heat dissipation component alone will not be practicable due to the size of the detector device.

For this reason, the housing of the detector device is designed and intended to be fixed in and/or on an appliance located outside the detector device, in particular a microscope, whereas the detector arranged in the housing so that it can move, together with a heat dissipation component, is pressed against a heat absorption component located outside the detector device by means of a spring device. In such an embodiment, the location of the fixing point or fixing points to fix the detector device in position relative to a heat dissipation component is advantageously irrelevant.

In general terms, in a particularly advantageous embodiment of the invention, the detector is arranged in the housing so that it can move against the force of a spring device. In particular, the detector device may advantageously comprise a spring device which is designed and intended to press a heat dissipation component of the detector against a heat absorption component located outside the detector device.

Such an embodiment has the particular advantage that the spring device ensures an adequate heat-conducting contact by exerting a force on the detector which is at least equal to the minimum pressing force mentioned above. Furthermore, this has the particular advantage that the detector device can be fixed on its housing in more or less any location on or in an appliance located outside the detector device, especially a microscope, while still ensuring an adequate level of heat-conducting contact between the heat dissipation component and the heat absorption component.

In particular, the detector device may comprise fixing elements such as threaded holes, lugs or flanges or similar items for fixing the detector device in an appliance located outside the detector device, said fixing elements being located at a distance from the heat transfer point between the heat dissipation component of the detector and the heat absorption component of the appliance located outside the detector device. In particular, it is even conceivable for the heat transfer point to be arranged in the region of one end of the housing of the detector device, while the detector device is designed and intended to be connected to the appliance located outside the detector device at the opposite end of the housing. Such an embodiment makes it possible to design a receptacle for the detector device located outside the detector device in the form of a blind hole recess, with a heat absorption component being positioned on its base. The one detector device according to the invention can be pushed forward into such a receptacle with the end comprising the heat dissipation component, and then fixed at the opposite end.

In an advantageous embodiment of the invention, it is possible to open the housing of the detector device, especially if said housing is fixed in an appliance located outside the detector device, and to remove the detector arranged inside the housing such that it can move without removing the other components of the detector device from the appliance located outside the detector device, which may, for example, take the form of a microscope. If repairs become necessary, for example, this has the particular advantage that only the detector itself needs to be dismantled, and not the entire detector device. In this case, repair or refitting can be carried out particularly quickly and effectively as a result. In a further advantageous manner, components of the detector device that do not form part of the detector, such as, for example, electronic components forming part of the power supply, can remain in the housing when replacing the detector.

It is particularly advantageous if the spring device can optionally be moved to a pressing position, in which the spring device exerts a force on the detector, or to a release position, in which the spring device does not exert any force on the detector. For example, the spring device can be moved into the release position to carry out installation or repair work. This may be the case, for example, if the detector, which is preferably designed as a detector module that can be handled separately, is to be removed from the detector device or replaced by a different or different type of detector.

In a particularly advantageous embodiment of the invention, the spring device comprises at least one resiliently-sprung pressing lever and/or a tensioning screw. In particular, it is conceivable that the tensioning screw may engage in a thread in the housing of the detector device. In particular, the spring device may comprise a tensioning screw with which a free end of a resiliently-sprung pressing lever can be fixed in a pivotable manner to create a pressing position against the housing and on the housing. The pressing lever may comprise a pressing cam by means of which a force can be applied to the detector located in the housing such that it can move when in the pressing position. Such an embodiment has the particular advantage that the spring device can be switched very simply, and without any major installation effort, from the pressing position to the release position or from the release position to the pressing position.

In particular, two resiliently-sprung pressing levers may also and advantageously be present, these being arranged parallel to one another in particular. In this manner, a force can be applied simultaneously, at different points, to the detector arranged in the housing such that it can move, with the result that the risk of the detector tilting inside the housing can be effectively avoided.

In a particularly advantageous embodiment of the invention, the resiliently-sprung pressing lever comprises two lever elements connected to one another by articulated means. In particular, it is conceivable that one of the lever elements may comprise a pressing cam, which is in contact with the detector at least in the pressing position. The pressing cam may be designed and arranged such that it is pressed in a wedge-like manner between the hinge axis of the articulated connection and the detector when the lever element carrying said cam is pivoted relative to another lever element. To this end, the pressing cam may have a sliding surface which slides along the external surface on which the pressing cam is located during this pivoting movement. Such an embodiment has the particular advantage that a force can be measured very carefully and applied in a targeted manner to the detector in the required direction. Furthermore, such an embodiment has the very particular advantage that the lever elements are automatically pivoted away from each other by the pressing cam when moving from the pressing position to the release position, and the free end of the pressing lever is raised. This in turn has the particular advantage that a tensioning screw, which is arranged in a receptacle for a screw head on the free end of the pressing lever such that it can rotate, is automatically lifted out of the threaded hole as soon as the tensioning screw is completely screwed out of the thread of the threaded hole. As a result, this advantageously ensures that the screw head of the tensioning screw does not need to be arranged such that it can be gripped by the fitter's fingers. Instead, the tensioning screw can be installed in a substantially concealed position, even in a space-saving manner, with no need for the fitter to remove the unscrewed tensioning screw in a laborious operation using long-nosed pliers or forceps.

In particular, in such an embodiment, it is preferable if the joint is extended in the pressing position in contact with a hinge stop. In this manner, a measured force can be applied to the detector in a targeted manner, while in the release position, as described above, it is possible to simply remove the unscrewed tensioning screw as a result of the bending position caused by the pressing cam when moving to the release position.

As described below in greater detail, the detector preferably comprises a plurality of detector components. Alternatively or in addition, it is particularly conceivable that the detector may be designed as a detector module that can be handled separately. Such a detector module that can be handled separately has the very particular advantage that, as described above, it can be removed from the housing of the detector device in its entirety, especially if the housing of the detector device is fixed in an appliance located outside the detector device, and in particular in a microscope.

As already mentioned, one of the detector components may be a heat dissipation component, which is particularly designed and intended to come into heat-conducting contact with a heat absorption component located outside the detector device. In particular, the detector may contain an active cooling component, for example a Peltier element. In this case, it is particularly conceivable that the hot side of the cooling component may be in heat-conducting contact with the heat dissipation component. Furthermore, the detector may also in particular comprise optical components to guide and form the incident light, such as, for example, at least one lens or a deflecting mirror. Alternatively, or in addition, the detector may also comprise one, or in particular precisely one acceleration stage for electrons (electron acceleration stage).

In a particular embodiment of the invention, the detector device contains at least one power source, which supplies a supply voltage of more than 100 V for the detector. Alternatively or in addition, it is conceivable that the detector may comprise a photocathode. In particular, the detector may comprise an avalanche diode which receives outgoing electrons from the photocathode and which is supplied with a first supply voltage. The first supply voltage may, for example, range between 400 V and 500 V. It is also conceivable that the detector may comprise at least one, or in particular precisely one electron acceleration stage, which is supplied with a second supply voltage. The second supply voltage is preferably higher than 5,000 V and may, for example, range between 7,000 V and 9,000 V and in particular be 8,000 V. In a particularly advantageous embodiment of the invention, the detector comprises at least one, or in particular precisely one electron acceleration stage, which contains the photocathode and the avalanche diode, between which the second supply voltage or the difference between the first supply voltage and the second supply voltage is applied.

The detector is preferably located inside the housing so that it cannot be moved to any position. It is usually sufficient if the detector is arranged such that it can be moved in a guided manner along a particularly linear or straight displacement direction inside the housing. To this end, the housing may include at least one guide component for the detector or may itself be designed such that it acts as a guide for the inserted detector.

In an advantageous embodiment of the invention, the housing comprises a heat dissipation opening through which heat from a heat dissipation component of the detector can be dissipated to a heat absorption component located outside the detector device. In particular, it is conceivable that a heat dissipation component of the detector may protrude outwards through the heat dissipation opening and be in external heat-conducting contact with a heat absorption component located outside the detector device. Alternatively, the heat dissipation opening may also be designed and arranged such that a heat absorption component located outside the detector device can protrude into the detector device from outside such that it comes into heat-conducting contact with a dissipation component of the detector in the housing of the detector device. Alternatively, it is of course also conceivable for the contact point between the heat dissipation component and the heat absorption component located outside the detector device to be located precisely in the heat dissipation opening. These embodiments have the particular advantage that the detector, especially in the form of a detector module that can be handled separately, can be arranged in the housing of the detector device such that they are protected and, in particular, electrically isolated, yet a reliable heat-conducting contact between the detector and a heat absorption component located outside the detector device is still ensured. This applies in particular if the detector, as described above, is pressed against a heat absorption component located outside the detector device with its heat dissipation component by means of a spring device.

The housing of the detector device has a light inlet opening through which an optical axis for the incident light to be detected passes. It is particularly advantageous if the light inlet opening is designed to be elongated so that the light to be detected can be admitted with a parallel offset if necessary. This may, for example, be necessary if the detector arranged in the detector device such that it can move is moved to a different position. An elongated light inlet opening also has the advantage that light can be admitted to the detector device even if it is spatially split, and in particular spatially and spectrally split.

In a particularly advantageous embodiment, the optical axis has a different orientation to the displacement direction. In particular, the optical axis and the displacement direction may be arranged perpendicular to one another. Such an embodiment has the particular advantage of creating a mechanical separation between the detector, which is arranged in the housing such that it can move, and the optical axis of the incident light.

Apart from the detector, the detector device may include additional detector device components, such as, for example, a power supply module or an electronic device for processing or evaluating primary electrical signals generated by the detector.

According to a specific, independent inventive implementation, which can also be regarded as separate from the embodiment of a detector arranged in a housing such that it can move, the detector device contains a circuit board with electronic components, said circuit board being held in the housing exclusively by clamping. In this case, it is for example conceivable that the housing may comprise a protrusion running around the inside of the housing and a housing lid with an edge protruding into the housing, an electronic circuit board being held clamped between the protrusion and the edge. The electronic circuit board may in particular have at least one ground layer, which is guided such that it conducts to the clamped edge. Such an embodiment has the particular advantage of ensuring a particularly good ground connection for the electronic circuit board. Furthermore, this ensures particularly low electromagnetic radiation behavior. In this case, it is particularly advantageous that the electronic circuit board does not need any screw holes to fix it in position.

A detector system comprising a detector device according to the invention and also a detector connection module to provide a receptacle for the detector device is particularly advantageous. The detector connection module may in particular comprise a heat absorption component, which is designed and intended to come into heat-conducting contact with a heat dissipation component of the detector in the detector device. The detector connection module preferably comprises fixing means so that the detector device can be fixed in the receptacle. In particular, the detector connection module may comprise lugs or threaded holes to fix the housing of the detector device in the receptacle.

The detector system may advantageously comprise a plurality of receptacles, each for one detector device according to the invention. Such a detector system is particularly suited to detecting different detection light bundles at the same time. The detection light bundles may, in particular, originate from a primary detection light bundle as a result of spatial spectral splitting.

Such a detector system having a plurality of receptacles also has the particular advantage that all detector devices can be controlled and/or regulated in a uniform manner.

According to a specific, independent inventive implementation, each of the detector devices that can be arranged in a detector system comprises a memory in which data specific to the detector device, such as, for example, at least one characteristic curve and/or at least one cooling parameter and/or at least one calibration value and/or sensitivity (or) and/or amplification and/or one application option are stored. This information can be used by a control device for the detector system to determine and/or adjust the individual detector devices, particularly in an application-specific manner. This inventive implementation is of course also feasible if just one single detector device is used in an appliance, for example in a microscope.

It is, for example, advantageously conceivable that the control device of the detector system may receive an item of information about the proposed usage from a user, for example the user of a microscope in which the detector system is installed, and adjusts all detector devices for the forthcoming application using the stored detector-specific information. Alternatively or in addition, it is also conceivable that one control device of the detector system may set a uniform trip threshold with reference to the current intensity of the generated electrical signals for all control devices, as a result of which the power supply device (or power supply devices) for the individual detector devices is/are switched off as soon as the trip threshold is reached.

Furthermore, it is particularly advantageous to have a microscope, in particular a scanning microscope or a confocal scanning microscope, comprising a detector device according to the invention and/or a detector system according to the invention. Such a microscope has the very particular advantage that the two-dimensional or three-dimensional images recorded are not falsified by functional defects in the detector device, or the detector device respectively. In particular, it advantageously avoids image artifacts caused by a poor signal-to-noise ratio in one or more detector devices or making it impossible to take images.

Furthermore, such a microscope has the particular advantage that both the detector devices in their entirety, as well as their detectors, can be simply and straightforwardly maintained and, if necessary, replaced, especially if they are designed as detector modules that can be handled separately.

Figure 1:
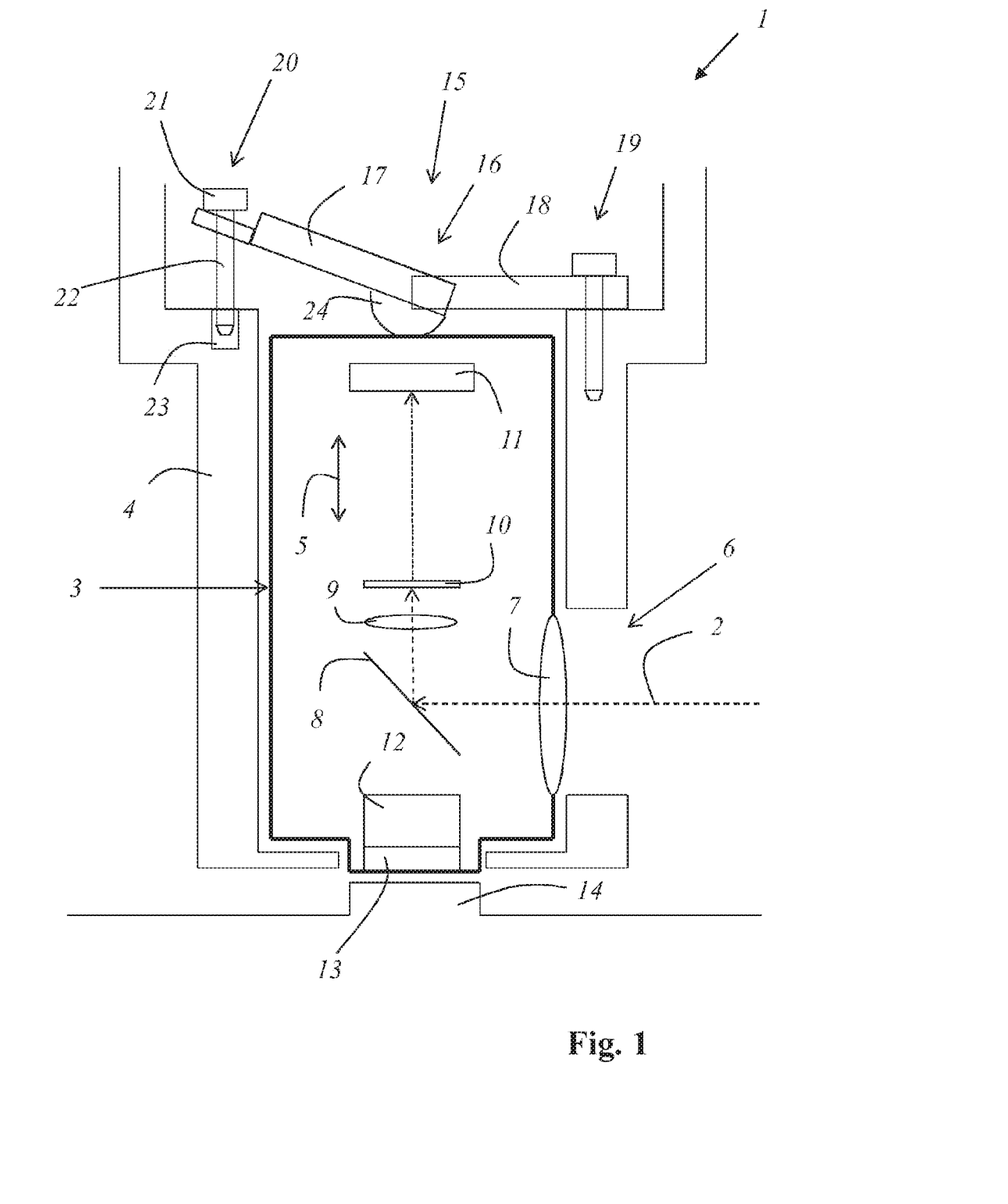
FIG. 1 is a detailed view of a first embodiment of a detector device according to the invention.

FIG. 1 is a detailed view of a first embodiment of a detector device 1 according to the invention. The detector device 1 is designed to capture light 2 and to generate electrical signals. To this end, the detector device comprises a detector 3 arranged such that it can move in a housing 4 of the detector device 1. In specific terms, the detector 3 is arranged in the housing 4 such that it can be moved and guided along a displacement direction 5, as shown by a double arrow in the drawing.

The incident light 2 to be detected enters via a light inlet opening 6 in the housing 4 and reaches a deflecting mirror 8 after passing through a first focusing lens 7. The optical axis of the incident light 2 is oriented perpendicular to the displacement direction 5.

The light 2 deflected by the defecting mirror 8 reaches a photocathode 10 after passing through a second focusing lens 9. The photocathode 10 is on an electric potential level that is several thousand volts lower than the potential level of the housing 4. In particular, it is conceivable that the potential level of the housing is 0 V, while the potential level of the photocathode 10 is lower than −1000 V, in particular lower than −5000 V, in particular lower than −7000 V, in particular in the range from −7000 V to −9000 V, in particular −8000 V.

The photocathode 10 is located at the start of an acceleration section, at the end of which an avalanche photodiode 11 is arranged. The avalanche photodiode 11 is on an electric potential level higher than the potential level of the housing 4. In particular, the potential level of the avalanche photodiode 11 is on a potential level ranging from 450 V to 500 V.

The electrons generated in the photocathode due to the photoelectric effect are accelerated due to the considerable potential difference over the acceleration section from the photocathode 10 to the avalanche diode 11. The electrical signals generated by the avalanche photodiode 11 are dissipated via an electrical cable.

The detector 3 also contains an active cooling component, specifically a Peltier element 12, the cold side of said element specifically being in heat-conducting contact with the photocathode 10. The hot side of the Peltier element 12 is in heat-conducting contact with a heat dissipation component 13, which is in heat-conducting contact with a heat absorption component 14 located outside the detector device in the pressing position.

The detector device 1 comprises a spring device 15 with a resiliently-sprung pressing lever 16. The resiliently-sprung pressing lever 16 in turn comprises two lever elements 17, 18 connected to one another by articulated means, namely a first lever element 17 and a second lever element 18.

Figure 2:
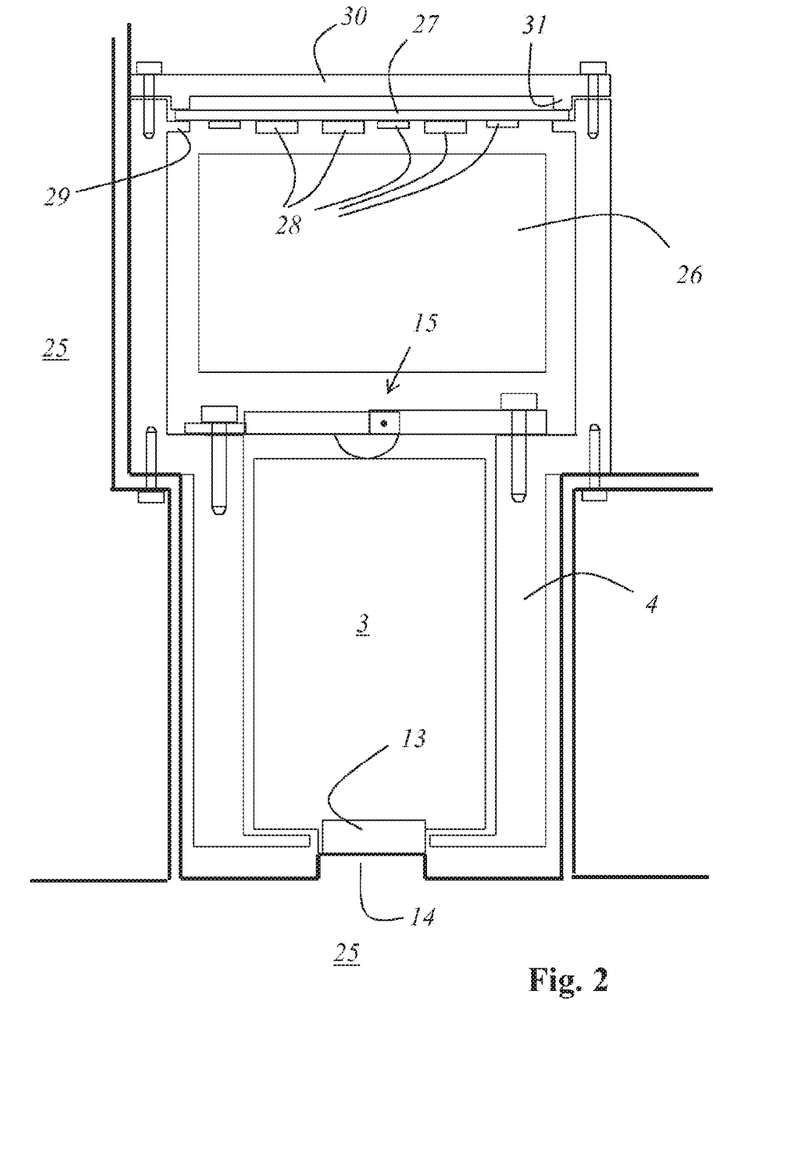
FIG. 2 shows the first embodiment of a detector device together with a detector connection module for the detector device.

The spring device 15 may optionally be moved into the release position shown in FIG. 1 or into a pressing position in which the heat dissipation component 13 is pressed against the heat absorption component 14. The pressing position is shown in FIG. 2.

The resiliently-sprung pressing lever 16 has a fixed end 19, which is screwed tightly to the housing 4. Furthermore, the resiliently-sprung pressing lever 16 has a free end 20 with a receptacle for the screw head 21 of a tensioning screw 22.

If the tensioning screw 22 is screwed into a threaded hole 23 in the housing 4, the resiliently-sprung pressing lever 16 is elongated, causing a pressing cam 24 to exert a force on the detector 3 along the displacement direction 5 and pressing the heat dissipation component 13 against the heat absorption component 14. The heat absorption component 14 preferably forms part of a detector connection module comprising a receptacle for the detector device 1.

If the tensioning screw 22 is unscrewed, the resiliently-sprung pressing lever 16 automatically moves into the bent position shown, in which the tensioning screw 14 is automatically moved out of the threaded hole 23 as soon as it leaves the last thread of the threaded hole 23 and can be removed.

FIG. 2 shows the first embodiment of the detector device 1 according to the invention, in which the spring device 15 is moved into the pressing position so that the heat dissipation component 13 and the heat absorption component 14 are pressed against one another. A heat-conducting intermediate layer, made from carbon polymer film, for example, may advantageously be inserted between the heat dissipation component 13 and the heat absorption component 14.

FIG. 2 also schematically shows a detector connection module 25 which provides a receptacle for the detector device 1. Furthermore, the detector connection module 25 comprises the heat absorption component 14.

In addition to the detector 3 and the spring device 15, the detector device 1 also comprises a power supply module 26. Furthermore, the detector device 1 comprises an electronic circuit board 27 which contains electronic components 28.

The housing 4 of the detector device 1 comprises a protrusion 29 running around the inside of the housing. The housing 4 also has a housing lid 30 with an edge protruding into the inside of the housing. The electronic circuit board 27 is clamped in position between the protrusion 29 and the edge.

Figure 3:
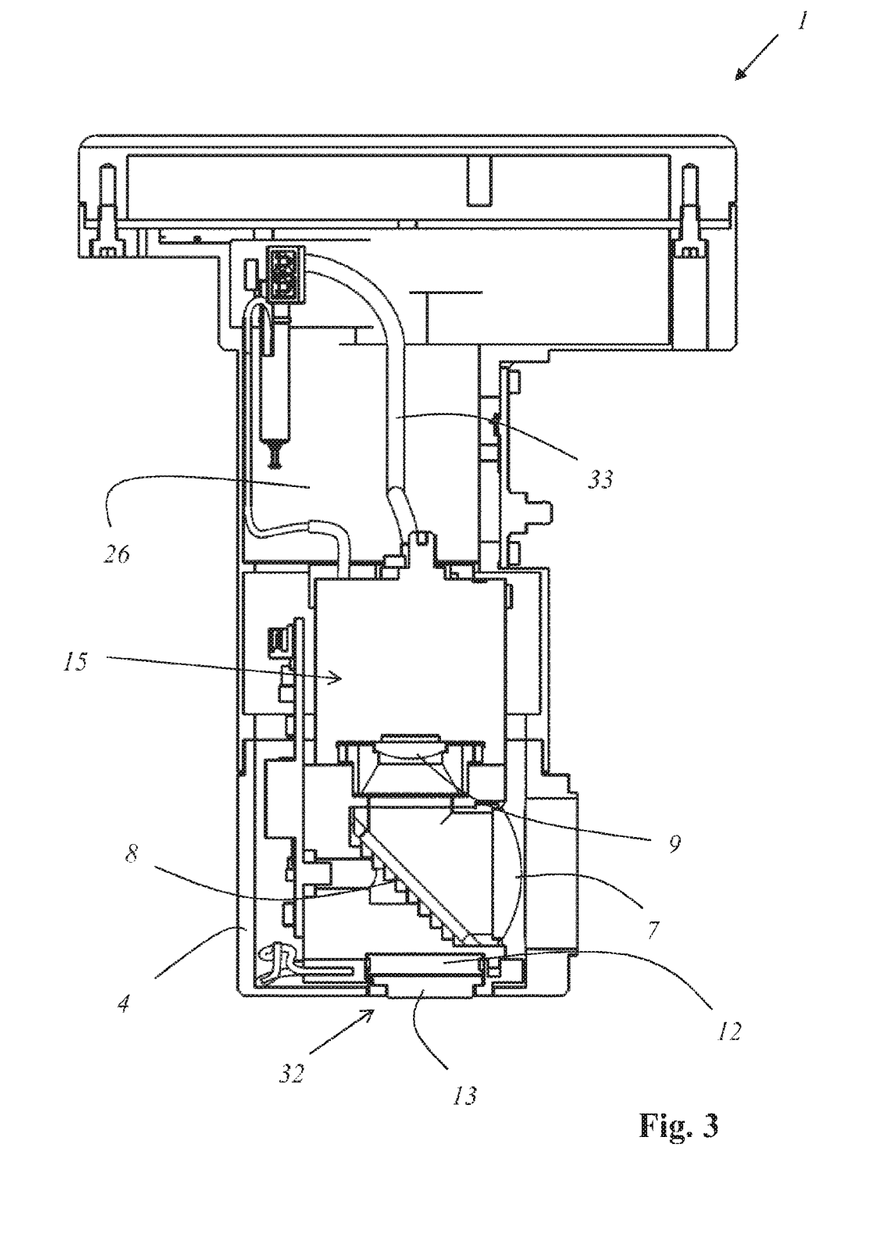
FIG. 3 shows a second embodiment of a detector device according to the invention.

FIG. 3 shows a second embodiment of a detector device 1 according to the invention. The detector device 1 comprises a detector 3 that can be handled separately. As in the first embodiment, the detector 3 comprises a first focusing lens 7, a deflecting mirror 8 and a second focusing lens 9. Furthermore, the detector 3 also comprises a Peltier element 12 and a heat dissipation component 13, which protrudes through a heat dissipation opening 32 in the housing 4 of the detector device 1. The detector device 1 contains a power supply module 26, which is connected to the detector 3 by a high-voltage cable 33. A special plug-in system for power transmission is used in this case, this being designed in accordance with an independent inventive implementation and described in more detail with reference to FIG. 7.

Figure 4:
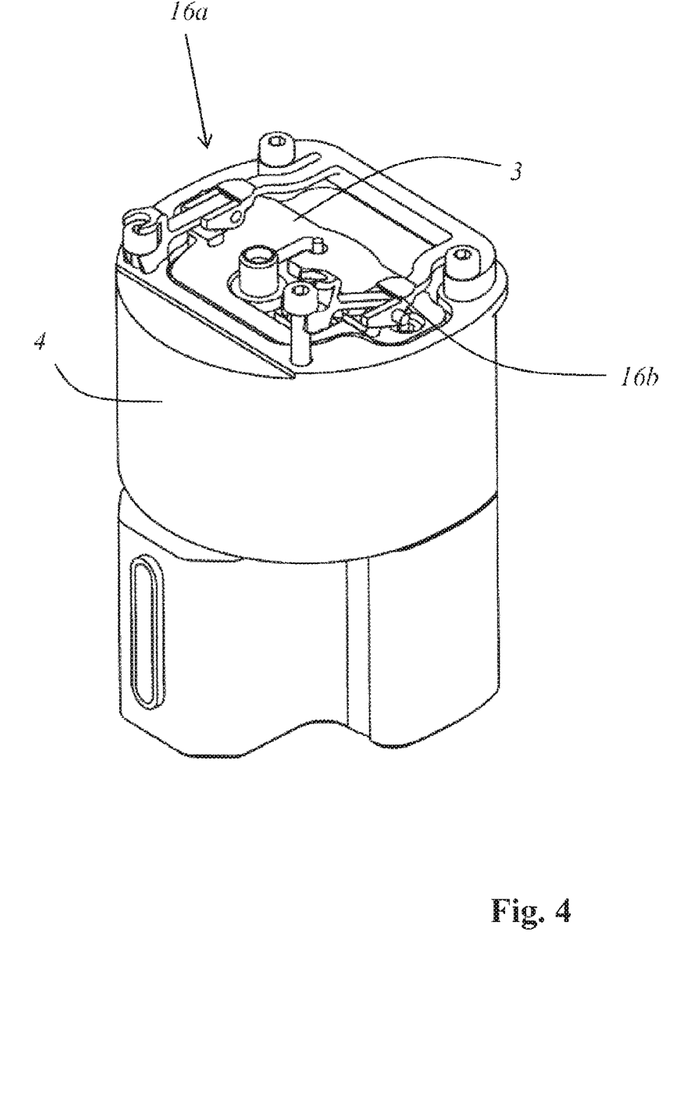
FIG. 4 is a perspective detailed view of the detector and the spring device of the second embodiment.

FIG. 4 is a perspective view of the module 3, shown schematically. Furthermore, FIG. 4 shows a spring device 15 comprising a first resiliently-sprung pressing lever 16a and a second resiliently-sprung pressing lever 16b. The first resiliently-sprung pressing lever 16a is shown in its release position, while the second resiliently-sprung lever 16b is shown in the pressing position.

Figure 5:
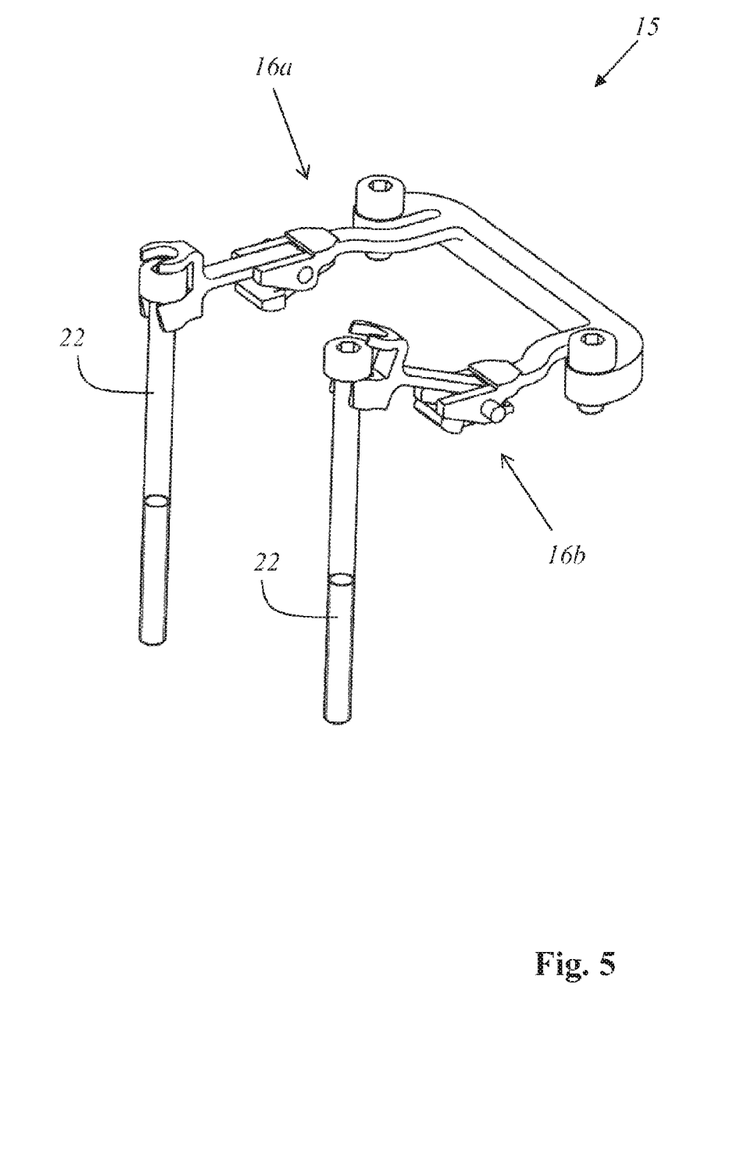
FIG. 5 is a separate drawing of the spring device.

FIG. 5 is a separate drawing of the resiliently-sprung pressing levers 16a and 16b, which also shows details of the special receptacles for the heads of the tensioning screws 22.

Figure 6A:
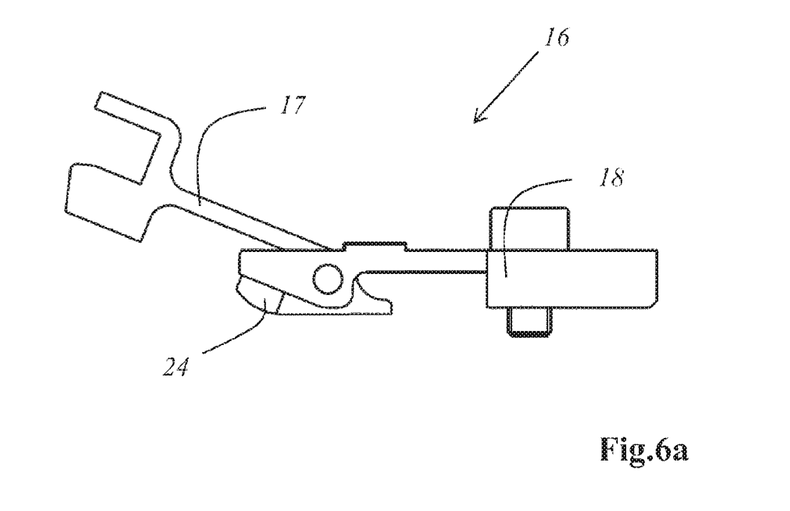
FIGS. 6a and 6b show the resiliently-sprung pressing lever.
Figure 6B:
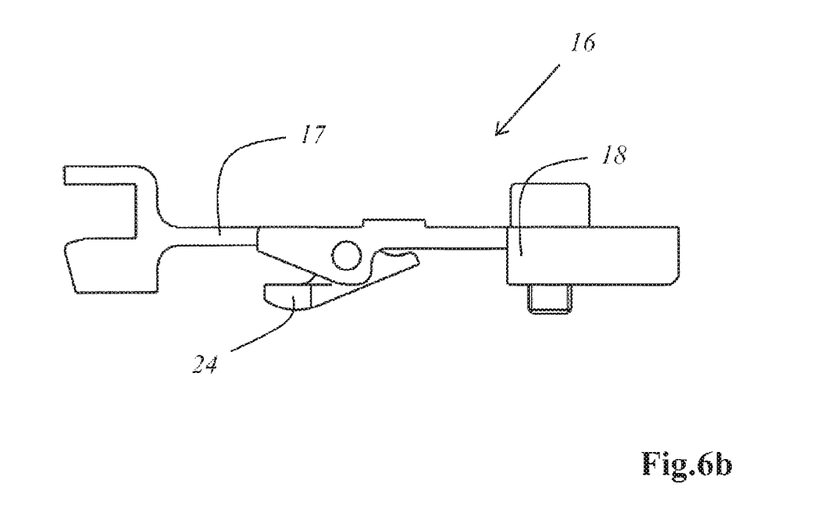

The resiliently-sprung pressing lever 16, with the first lever element 17 and the second lever element 18 in each case, and with the pressing cam 24, are illustrated again in detail in FIGS. 6a and 6b, where FIG. 6a shows the release position and FIG. 6b shows the pressing position of the pressing lever 16.

Figure 7:
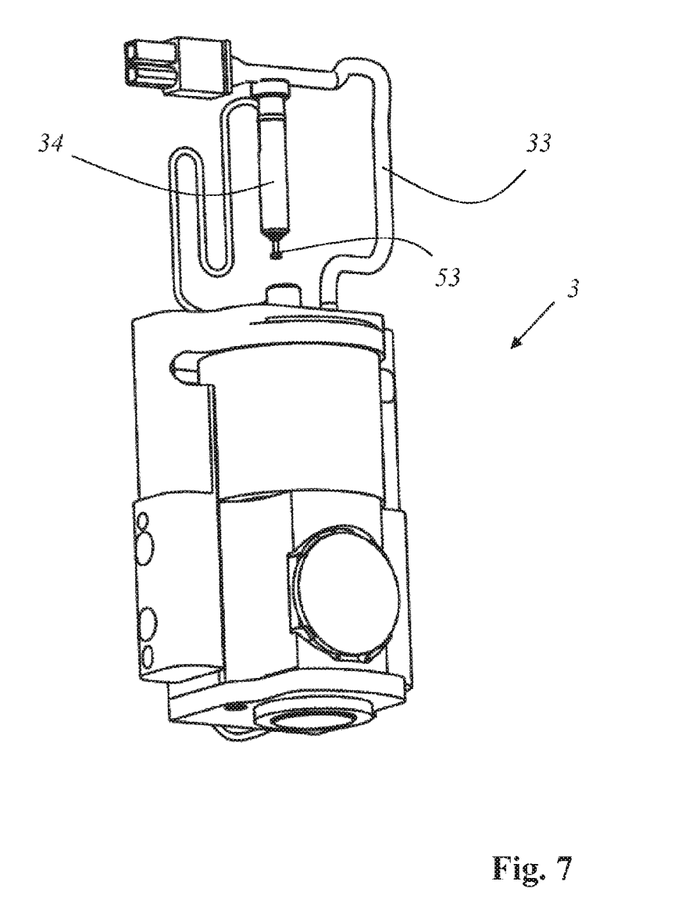
FIG. 7 is a detailed view of the detector in the second embodiment, FIG. 8 schematically shows an embodiment of an electronic component for a detector device according to the invention.

FIG. 7 shows the module 3, which can be connected by electrical means to a power supply module 26, which is not illustrated in this drawing, by means of the high-voltage cable 33 and a connected high-voltage plug 34. The power supply module 26 is shown schematically in FIG. 8. The high-voltage plug 34 is plugged into a socket on the power supply module 26. The high-voltage plug 34 is designed according to an independent inventive implementation and comprises a cylindrical and preferably approximately 3 cm long plug housing having a diameter preferably measuring approximately 5 mm. A preferably gold or gold-plated spring pin 53 is located at the top of the high-voltage plug 34, said pin being able to be pressed into the plug housing against spring tension (similar to a ballpoint pen). The spring pin 53 is arranged and intended to lie against a contact bracket of the power supply module 26 to which the supply voltage is applied when the plug is inserted in the socket. The plug is extremely small compared to high-voltage plugs in the prior art and represents an independent inventive aspect.

Figure 8:
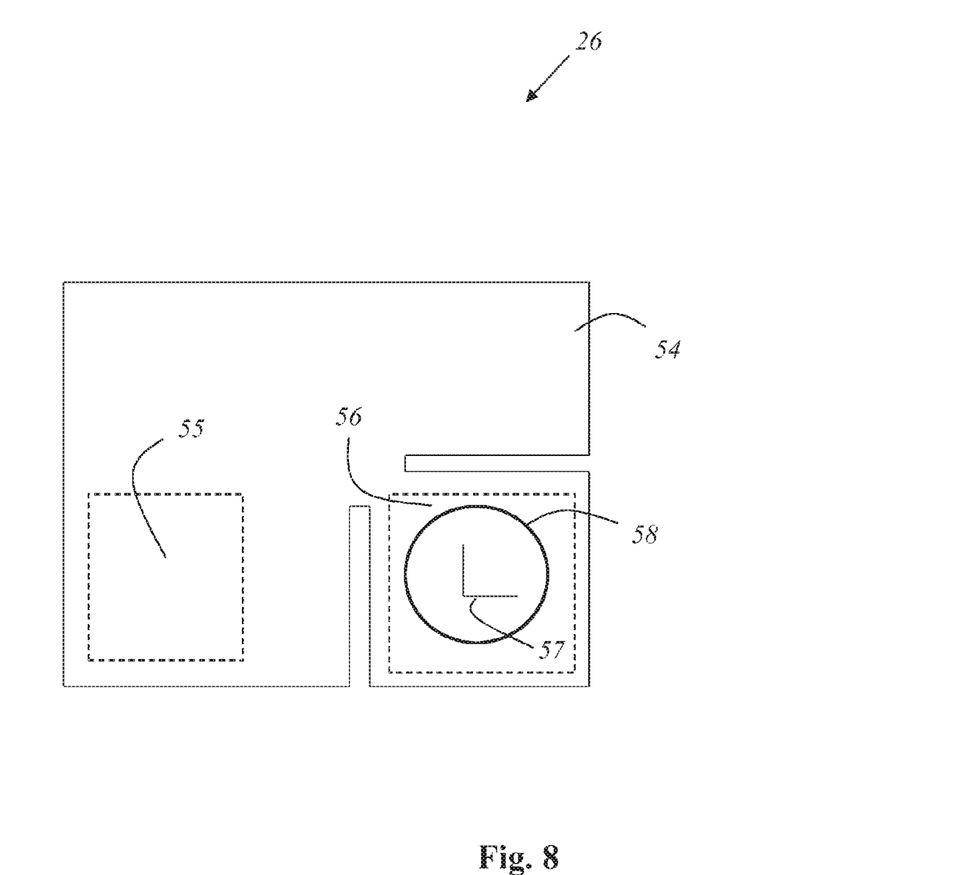

FIG. 8 schematically shows a possible power supply module 26. The power supply module 26 comprises a circuit board 54 which has two voltage sources 55, 56 on its rear side for providing the two supply voltages. A contact bracket 57 is positioned on the circuit board 54 from which the supply voltage of 8000 V can be taken. An O-ring 58 is provided in the region around the contact bracket 55 to prevent arcing. Furthermore, the circuit board 54 comprises two slots in the vicinity of the contact bracket 57, in which two protrusions of a cover 59, which is placed, preferably milled, on the circuit board 57, engage. This thus prevents voltage flashover to other components arranged on the circuit board 54.

The cover 59 placed on the circuit board 54 comprises a cylindrical receptacle in which the high-voltage plug 34 can be inserted.

Figure 9:
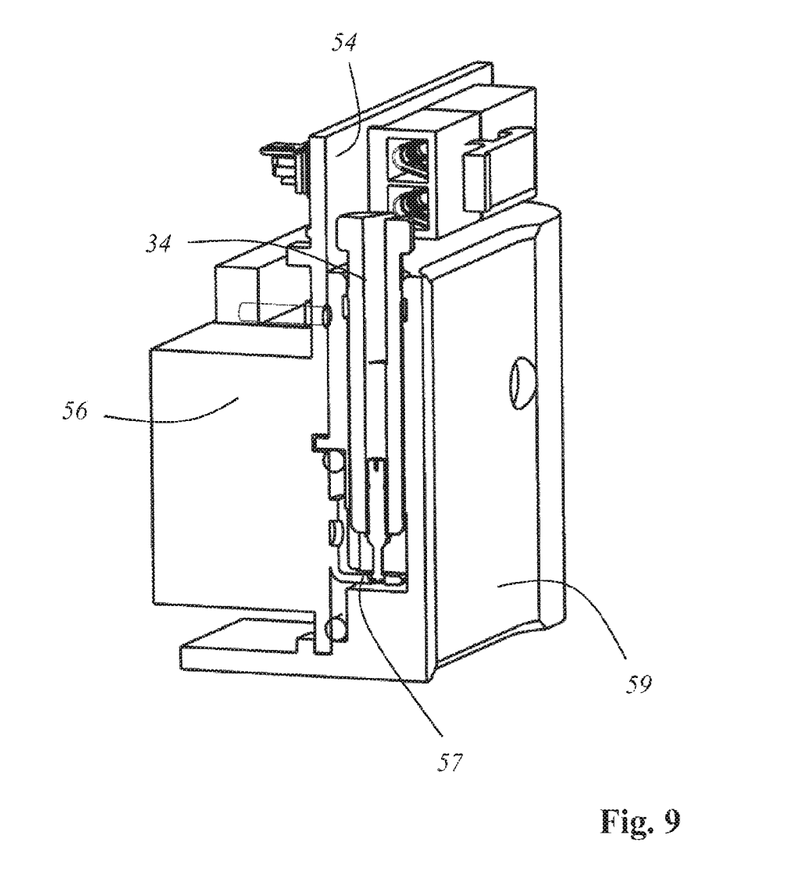
FIG. 9 shows another embodiment of an electronic component for a detector device according to the invention.

FIG. 9 shows another embodiment of a possible power supply module 26 with a similar design, specifically showing the positioned cover 59 with the cylindrical receptacle for a high-voltage plug 34, which engages in slots in the circuit board 54.

Figure 10:
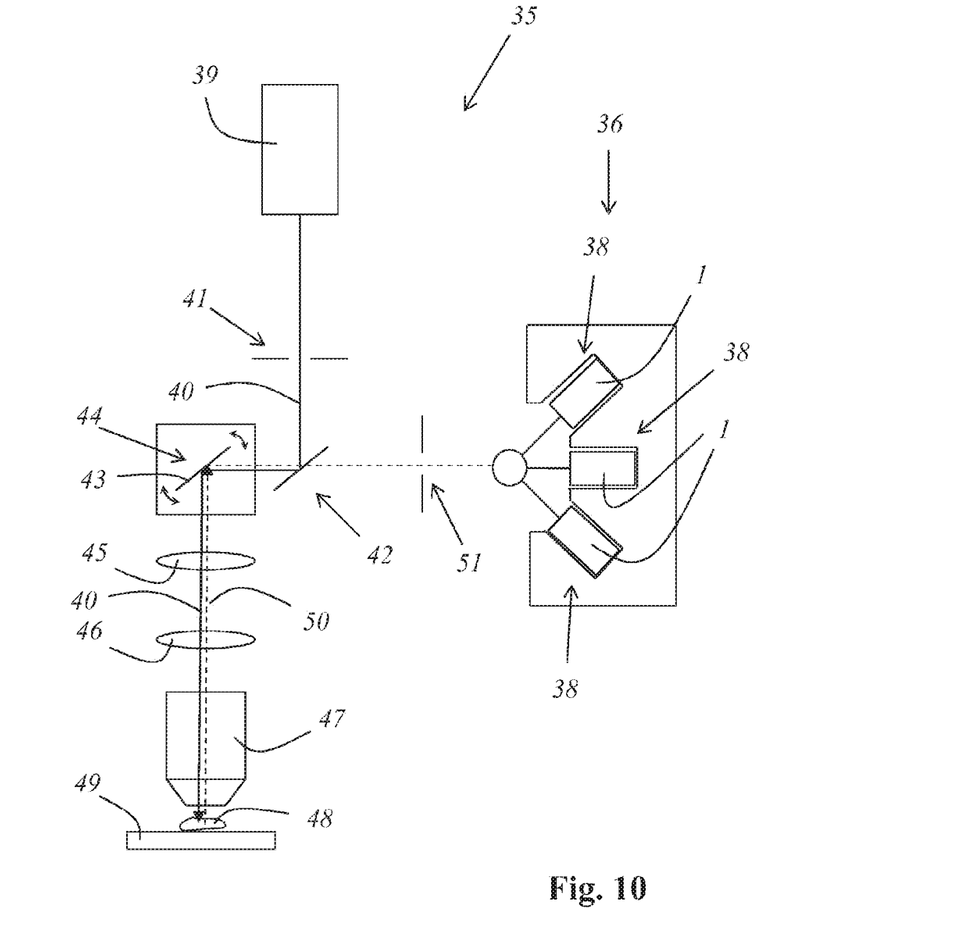
FIG. 10 shows an embodiment of a microscope comprising a detector system according to the invention having a plurality of detector devices according to the invention

FIG. 10 schematically shows a microscope 35 designed as a confocal scanning microscope. The microscope has a detector system 36, comprising a detector connection module 37 having a plurality of receptacles 38, each for one detector device 1.

The illumination light 40 originating from a light source 39 reaches a main beam splitter 42 after passing through a lighting pinhole 41 and is deflected by said splitter to a beam deflection device 43 which contains a gimbal-mounted oscillating mirror 44. The illumination light then passes through a scan lens 45 and a tube lens 46 to reach a lens 47 and is focused by said lens onto a specimen 48 to be examined, said specimen being arranged on a microscope stage 49. The detection light 50 originating from the specimen 48 passes back to the beam deflection device 43 through the lens 47, the tube lens 46 and the scan lens 45 on the same light path, and reaches a detection pinhole 51 after passing through the main beam splitter 42. The light passing through the detection pinhole 51 is sent to the different detector devices 1 by a splitting device 52, which splits the detection light by spatial and spectral means such that the individual detector devices 1 are able to detect different spectral components of the detection light 50.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A detector device which is designed to capture light and to generate electrical signals, the detector device comprising:
   a housing; and
   a detector disposed in the housing so as to be moveable at least partially in the housing and with respect to the housing,
   wherein at least one of:
   a. the detector is arranged such that the detector is moveable in the housing against a force of a spring device;
   b. a spring device is configured to press a heat dissipation component of the detector against a heat absorption component located outside the detector device; or
   c. a spring device presses a heat dissipation component of the detector against a heat absorption component located outside the detector device.

2. The detector device according to claim 1, wherein at least one of:
   the detector comprises a plurality of detector components; or
   the detector is designed as a detector module that is separately handleable.

3. The detector device according to claim 2, wherein the detector comprises the plurality of detector components and one of the detector components is a heat dissipation component, an active cooling component, a photocathode, an optical component, a lens, a mirror or an acceleration stage.

4. The detector device according to claim 1, wherein at least one of:
   the detector is arranged such that the detector is moveable and guidable along a particularly linear displacement direction; or
   the housing has a guide for the detector which defines the particularly linear displacement direction.

5. The detector device according to claim 1, wherein the detector is arranged such that the detector is moveable in the housing against the force of the spring device.

6. The detector device according to claim 1, wherein the spring device is selectively moveable into a pressing position, in which the spring device exerts a force on the detector, or into a release position, in which the spring device does not exert any force on the detector.

7. The detector device according to claim 1, wherein at least one of:
   a. the spring device comprises at least one resiliently-sprung pressing lever;
   b. the spring device comprises a tensioning screw which engages in a thread in the housing; or
   c. the spring device comprises a tensioning screw with which a free end of a resiliently-sprung pressing lever is fixable in a pivotable manner to create a pressing position against the housing and on the housing.

8. The detector device according to claim 7, wherein at least one of:
   a. the resiliently-sprung pressing lever comprises two lever elements connected to one another by an articulation;
   b. the resiliently-sprung pressing lever comprises two lever elements, one of which has a pressing cam, which lies on the detector at least in the pressing position;
   c. the resiliently-sprung pressing lever has a receptacle at a free end configured to receive a screw head of the tensioning screw;
   d. the resiliently-sprung pressing lever comprises two lever elements connected to one another by an articulation, a joint being extended in the pressing position in contact with a hinge stop; or
   e. the resiliently-sprung pressing lever comprises two lever elements connected to one another by an articulation, a joint being bent in the release position and/or automatically being bent by movement from the pressing position to a release position.

9. The detector device according to claim 1, wherein at least one of:
   a. the housing comprises at least one heat dissipation opening disposed such that heat from the heat dissipation component of the detector will dissipate to the heat absorption component located outside the detector device; or
   b. the housing comprises at least one heat dissipation opening through which the heat dissipation component of the detector protrudes or through which the heat absorption component located outside the detector device protrudes, or in which the heat dissipation component of the detector is in contact with the heat absorption component located outside the detector device.

10. The detector device according to claim 1, wherein the detector comprises at least one Peltier element and the heat dissipation component is in heat-conducting contact with a hot side of the at least one Peltier element.

11. The detector device according to claim 1, wherein the housing comprises at least one light inlet opening, through which an optical axis for the incident light to be detected passes.

12. The detector device according to claim 11, wherein at least one of:
   the optical axis has a different orientation to a displacement direction of the detector; or
   the optical axis and a displacement direction of the detector are positioned perpendicular to one another.

13. The detector device according to claim 1, wherein the housing comprises a protrusion running around an inside of the housing and a housing lid with an edge protruding into the housing, an electronic circuit board being held clamped between the protrusion and the edge.

14. A detector system comprising:
   at least one detector device comprising:
      a housing; and
      a detector disposed in the housing so as to be moveable at least partially in the housing and with respect to the housing, wherein at least one of:
         a. the detector is arranged such that the detector is moveable in the housing against a force of a spring device:
         b. a spring device is configured to press a heat dissipation component of the detector against a heat absorption component located outside the detector device; or
         c. a spring device presses a heat dissipation component of the detector against a heat absorption component located outside the detector device; and
   a detector connection module which has a receptacle configured to receive the detector device.

15. The detector system according to claim 14, wherein the detector connection module comprises a heat absorption component.

16. The detector system according to claim 14, wherein the detector connection module includes a plurality of receptacles each being configured to receive one detector device.

17. A microscope, comprising:
   a detector device, comprising:
      a housing; and
      a detector disposed in the housing so as to be moveable at least partially in the housing and with respect to the housing, wherein at least one of:
         a. the detector is arranged such that the detector is moveable in the housing against a force of a spring device:
         b. a spring device is configured to press a heat dissipation component of the detector against a heat absorption component located outside the detector device; or
         c. a spring device presses a heat dissipation component of the detector against a heat absorption component located outside the detector device.

18. The microscope according to claim 17, wherein the microscope is a scanning microscope or confocal scanning microscope.

19. The microscope according to claim 17, further comprising a detector connection module which has a receptacle configured to receive the detector device.

20. The detector device according to claim 1, wherein the spring device presses the heat dissipation component of the detector against the heat absorption component located outside the detector device.

* * * * *